US012643100B2

(12) United States Patent
Jones et al.

(10) Patent No.: US 12,643,100 B2
(45) Date of Patent: Jun. 2, 2026

(54) MICROFLUIDIC SYSTEM AND A METHOD FOR PROVIDING A SAMPLE FLUID HAVING A PREDETERMINED SAMPLE VOLUME

(71) Applicant: miDiagnostics NV, Heverlee (BE)

(72) Inventors: Benjamin Jones, Leuven (BE); David Mikaelian, Leuven (BE)

(73) Assignee: miDiagnostics NV, Heverlee (BE)

( * ) Notice: Subject to any disclaimer, the term of this patent is extended or adjusted under 35 U.S.C. 154(b) by 928 days.

(21) Appl. No.: 17/760,420

(22) PCT Filed: Feb. 19, 2021

(86) PCT No.: PCT/EP2021/054166
§ 371 (c)(1),
(2) Date: Aug. 9, 2022

(87) PCT Pub. No.: WO2021/165473
PCT Pub. Date: Aug. 26, 2021

(65) Prior Publication Data

US 2023/0096026 A1 Mar. 30, 2023

(30) Foreign Application Priority Data

Feb. 19, 2020 (EP) .................................... 20158276

(51) Int. Cl.
*B01L 3/00* (2006.01)

(52) U.S. Cl.
CPC ... *B01L 3/502746* (2013.01); *B01L 3/502738* (2013.01); *B01L 2200/0605* (2013.01); *B01L 2200/0621* (2013.01); *B01L 2200/16* (2013.01); *B01L 2300/087* (2013.01); *B01L 2400/0406* (2013.01); *B01L 2400/0622* (2013.01); *B01L 2400/0688* (2013.01); *B01L 2400/082* (2013.01)

(58) Field of Classification Search
None
See application file for complete search history.

(56) References Cited

U.S. PATENT DOCUMENTS

2005/0133101 A1 6/2005 Chung et al.
2005/0249641 A1* 11/2005 Blankenstein ...... F16K 99/0057 422/400

FOREIGN PATENT DOCUMENTS

EP 1925365 A1 5/2008
JP 2004225912 A 8/2004
(Continued)

*Primary Examiner* — Maris R Kessel
*Assistant Examiner* — Madison T. Herbert
(74) *Attorney, Agent, or Firm* — Hodgson Russ LLP

(57) ABSTRACT

The present invention relates to a microfluidic system (10, 20) comprising: a sample reservoir (110, 210); a first sample channel (120, 220) connected to the sample reservoir (110, 210), branching off into a second sample channel (122, 222) ending in a first valve (130, 230), and into a third sample channel (124, 224) which branches off into a fourth sample channel (126, 226) ending in a second valve (132, 232), and into a fifth sample channel (128, 228) ending in a third valve (134, 234); a buffer reservoir (140, 240); a first trigger channel (150, 250) arranged to connect the buffer reservoir (140, 240) to the second valve (132, 232); a second trigger channel (152, 252) connecting the second valve (132, 232) and the first valve (130, 230); and an exit channel (154, 254) connected to the first valve (130, 230).

9 Claims, 3 Drawing Sheets

(56) References Cited

FOREIGN PATENT DOCUMENTS

| | | | | | |
|---|---|---|---|---|---|
| JP | 2008122179 | A | | 5/2008 | |
| JP | 2010281645 | A | | 12/2010 | |
| WO | 2018/132831 | A2 | | 7/2018 | |
| WO | WO-2018197337 | A1 | * | 11/2018 | ........ B01L 3/502738 |
| WO | WO-2018200896 | A1 | * | 11/2018 | ........ B01L 3/502738 |

* cited by examiner

MICROFLUIDIC SYSTEM AND A METHOD FOR PROVIDING A SAMPLE FLUID HAVING A PREDETERMINED SAMPLE VOLUME

TECHNICAL FIELD

The present invention relates to a microfluidic system and a method for providing a sample fluid having a predetermined volume. The present invention further relates to a diagnostic device comprising the microfluidic system and a method for providing a sample fluid having a predetermined volume.

BACKGROUND OF THE INVENTION

Microfluidics deal, among other things, with control of fluids that are geometrically constrained to small scales. Such technology is commonly used within ink-jet printer heads, DNA analysis chips, as well as for other types of "lab-on-a-chip". In many applications, passive fluid control is used, which may be realised by utilising capillary action that arise within tubes having sub-millimetre dimensions.

Such systems may be used when measurement and control of volumes is needed, for example in blood cell differentiation or counting, where the volume of the blood sample processed must be accurately known. In a system where a relatively large blood sample (>10 μl) is added, it may not be desirable to process the entire sample of blood since only a minute quantity (<10 μl) is needed to get accurate statistics on the blood cell make-up or distribution. Therefore, the sampling systems need to measure a known quantity of blood from the sample for processing.

However, precise volume metering in systems using capillary action is challenging, since existing systems of such type generally do not allow for shutting or closing off a fluid stream once it has started. Therefore, a precisely metered volume of fluid cannot simply be extracted from a sample by shutting off the flow to prevent too much sample from flowing into the system. Thus, there exists a need for an improved microfluidic system providing a sample having a precisely metered volume.

US 2005/133101 A1 relates to a microfluidic control device and method for controlling the microfluid. In particular, a pressure barrier of a capillary is removed by a surface tension change resulted from a solution injection to obtain transport, interflow, mixing, and time delay of the microfluid.

WO 2018/132831 A2 relates to devices for simultaneous generation and storage of isolated droplets, and methods of making and using the same.

EP 1 925 365 A1 relates to a micro total analysis chip and micro total analysis system.

SUMMARY OF THE INVENTION

It is an object to mitigate, alleviate or eliminate one or more of the above-identified deficiencies in the art and disadvantages singly or in any combination and solve at least one above-mentioned problem.

According to a first aspect a microfluidic system for providing a sample fluid having a predetermined sample volume is provided. The system comprises: a sample reservoir arranged for receiving a sample fluid; a first sample channel connected to the sample reservoir, the first sample channel branching off into a second sample channel ending in a first valve, and into a third sample channel, the third sample channel branching off into a fourth sample channel ending in a second valve, and into a fifth sample channel ending in a third valve, wherein the fifth sample channel has a predetermined volume; a buffer reservoir arranged for receiving a buffer fluid; a first trigger channel arranged to connect the buffer reservoir to the second valve; a second trigger channel connecting the second valve and the first valve; and an exit channel having a first end and a second end, wherein the first end is connected to the first valve; wherein the first sample channel is arranged to draw sample fluid from the sample reservoir to fill the first, second, third, fourth, and fifth sample channels by capillary action; wherein the first trigger channel is arranged to draw buffer fluid from the buffer reservoir, by capillary action, to the exit channel via a fluid path comprising the second trigger channel, and to open the second valve and the first valve, whereby a further fluid path comprising the fourth sample channel, the third sample channel, and the second sample channel is opened up, allowing for sample present in the fourth sample channel, the third sample channel, and the second sample channel to be replaced by buffer fluid from the first trigger channel and flow into the exit channel together with buffer fluid from the second trigger channel, thereby isolating a sample fluid present in the fifth sample channel from adjacent sample fluid, wherein a volume of the isolated sample fluid corresponds to the volume of the fifth sample channel, thereby providing the sample fluid having the predetermined sample volume.

By means of the present microfluidic system, a metered volume of the sample fluid is provided. Thus, the sample having the predetermined volume is provided by a microfluidic system utilising capillary action without actively controlling the flows within the system. It is typically problematic to stop flows arising from capillary action, and it may therefore be advantageous to meter the sample having the predetermined volume by means of the present microfluidic system.

Further, an analysis of the sample fluid having the predetermined volume may be enhanced, since the volume of the sample fluid is accurately known (i.e. the predetermined volume corresponds to the volume of the fifth sample channel).

The microfluidic system may further comprise: a timing channel connecting the buffer reservoir and the third valve, wherein the timing channel may be arranged to draw, by capillary action, buffer fluid from the buffer reservoir to an output of the third valve and to open the third valve, whereby the isolated sample fluid present in the fifth channel may be allowed to flow through the output of the third valve together with buffer fluid from the timing channel.

An associated advantage is that isolated sample fluid may be extracted from the microfluidic system, and may thereby be provided to a further system, e.g. an analysis system arranged to analyse the isolated sample fluid. It may be advantageous to precisely meter the sample fluid to be analysed, which may be allowed by the present microfluidic system.

The timing channel may be configured to open the third valve subsequent to the sample fluid present in the fifth sample channel being isolated from adjacent sample fluid.

An associated advantage is that the volume of the sample fluid flowing through the output of the third valve may be more precisely determined, since sample fluid adjacent to the isolated sample fluid may not flow through the output of the third valve. Hence, the volume of the sample fluid extracted from the microfluidic system may be more precisely metered.

It is a further advantage that a mixing ratio between the sample fluid having the predetermined volume and buffer fluid may be controlled for the fluid flowing through the output of the third valve, e.g., by the flow resistances of the microfluidic system (primarily by controlling the flow resistances of the timing channel, the first trigger channel, the fourth sample channel, and the fifth sample channel).

The timing channel may comprise a first flow resistor, wherein a flow resistance of the first flow resistor may be selected to control the flow rate from the buffer reservoir to the third valve such that the third valve may be opened subsequent to sample fluid in the fifth sample channel being isolated from adjacent sample fluid.

An associated advantage is that a length of the timing channel may be decreased, while still allowing for the third valve to be opened subsequent to the sample fluid in the fifth sample channel being isolated from adjacent sample fluid.

The microfluidic system may further comprise a capillary pump arranged to empty the sample reservoir.

An associated advantage is that the sample reservoir may receive sample fluid having a larger volume than a combined volume of the first, second, third, fourth, and fifth sample channel, thereby reducing a need to limit the volume of the sample fluid received by the sample reservoir. In case sample fluid is present in the sample reservoir subsequent to filling the first, second, third, fourth, and fifth sample channel, additional sample fluid may be drawn by capillary action from the sample reservoir upon opening the first, the second, and/or the third valves.

The capillary pump may be connected to the sample reservoir via a second flow resistor, wherein a flow resistance of the second flow resistor may be selected to control the flow rate from the sample reservoir to the capillary pump such that the sample reservoir may be emptied subsequent to the first sample channel, the second sample channel, the third sample channel, the fourth sample channel, and the fifth sample channel having been filled with sample fluid.

An associated advantage is that the volume of the sample fluid flowing through the output of the third valve may be more precisely determined, since the sample reservoir is not emptied prior to the fifth sample channel being filled with sample fluid. Hence, the volume of the sample fluid extracted from the microfluidic system may be more precisely metered.

The microfluidic system may further comprise a stop valve connected to the second end of the exit channel.

The microfluidic system may further comprise: a vent connected to the stop valve, wherein the vent may be arranged to allow gaseous communication between the stop valve and surroundings of the microfluidic system such that gas present in the exit channel may be allowed to escape.

An associated advantage is that an improved flow of the sample fluid and/or the buffer fluid may be allowed, since a build-up of gaseous pressure in the channels acting against the capillary action of the channels may be avoided.

The sample fluid and/or the buffer fluid may be an aqueous liquid.

One or more walls of the channels may comprise silica, glass, a polymeric material, polycarbonate, silicon, poly (methyl methacrylate) (PMMA), polydimethylsiloxane (PDMS), and/or cyclic olefin copolymer (COC).

The timing channel may connect the buffer reservoir and the third valve via a fourth valve, and the microfluidic system may further comprise: a dilution channel connecting the buffer reservoir and the fourth valve, the dilution channel being configured to draw, by capillary action, buffer fluid from the buffer reservoir to the fourth valve; and wherein the timing channel may be further configured to open the fourth valve, whereby buffer fluid is allowed to flow from the dilution channel to the third valve.

An associated advantage is that a dilution ratio of the fluid flowing through the output of the third valve may be controlled by adjusting the flow rate in the dilution channel and the channel connecting the fourth valve and the third valve.

According to a second aspect a diagnostic device comprising the microfluidic system of the first aspect is provided.

The above-mentioned features of the first aspect, when applicable, apply to this second aspect as well. In order to avoid undue repetition, reference is made to the above.

The diagnostic device may be arranged to analyse the provided sample fluid having the predetermined sample volume.

According to a third aspect a method for providing a sample fluid having a predetermined sample volume is provided. The method comprising: adding sample fluid to a sample reservoir, whereby a first sample channel draws sample fluid from the sample reservoir to fill the first sample channel, a second sample channel, a third sample channel, a fourth sample channel, and a fifth sample channel by capillary action, wherein the second sample channel and the third sample channel are branches of the first sample channel, and the fourth sample channel and the fifth sample channel are branches of the third sample channel, wherein the second sample channel ends in a first valve, the fourth sample channel ends in a second valve, and the fifth sample channel ends in a third valve; adding buffer fluid to a buffer reservoir, whereby a first trigger channel draws buffer fluid from the buffer reservoir, by capillary action, to an exit channel connected to the first valve, wherein the buffer fluid is drawn to the exit channel via a fluid path comprising a second trigger channel connecting the first valve and the second valve, and opens the second valve and the first valve such that a further fluid path comprising the fourth sample channel, the third sample channel, and the second sample channel is opened up, and sample present in the fourth sample channel, the third sample channel, and the second sample channel is replaced by buffer fluid from the first trigger channel and flows via the further fluid path into the exit channel together with buffer fluid from the second trigger channel, whereby a sample fluid present in the fifth sample channel is isolated from adjacent sample fluid and having a volume corresponding to a volume of the fifth sample channel, thereby providing the sample fluid having the predetermined sample volume.

The above-mentioned features of the first and second aspects, when applicable, apply to this third aspect as well. In order to avoid undue repetition, reference is made to the above.

The method may further comprise: opening the third valve such that isolated sample fluid flows through an output of the third valve.

The method may further comprise: subsequent to adding sample fluid to the sample reservoir and antecedent to adding buffer fluid to the buffer reservoir, emptying the sample reservoir by use of a capillary pump connected to the sample reservoir.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the invention. The figures should not be considered limiting the invention to the specific variant; instead they are used for explaining and understanding the inventive concept.

As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

It is to be understood that at least the first sample channel, the second sample channel, the third sample channel, the fourth sample channel, the fifth sample channel, the first trigger, the second trigger channel, the exit channel, and the timing channel are capillary channels. A capillary channel is a channel capable of providing a capillary-driven flow of a liquid. It is also to be understood that other channels of the system may be capillary channels and/or other types of channels depending on the specific implementation of the present inventive concept.

In the following, fluid is described as flowing through channels and reaching certain positions at different times within the microfluidic system. Flow rates of these flows may be controlled in different manners in order for the fluid to reach the positions at the described times. A capillary-driven flow of a fluid requires one or more contacting surfaces that the fluid can wet. For example, surfaces comprising glass or silica may be used for capillary-driven flows of aqueous liquids. Further, for example, suitable polymers with hydrophilic properties, either inherent to the polymer or by modification, including for example chemical modification or coating, may promote or enhance capillary driven flows.

The flows may be controlled, for example, by adapting the length of the channels and/or by adapting the flow resistances of the channels. The flow resistance of a channel may be controlled by adapting a cross-sectional area of the channel and/or the length of the channel. The flow resistance of a channel may further be dependent on properties of the liquid, e.g. its dynamic viscosity. Additionally, or alternatively, the flow rate may be adapted by using flow resistors.

To provide desired capillary forces, dimensions of flow channels may be selected dependent on, for example, the properties of the liquid and/or material and/or properties of walls of the channels.

Figure 1A:
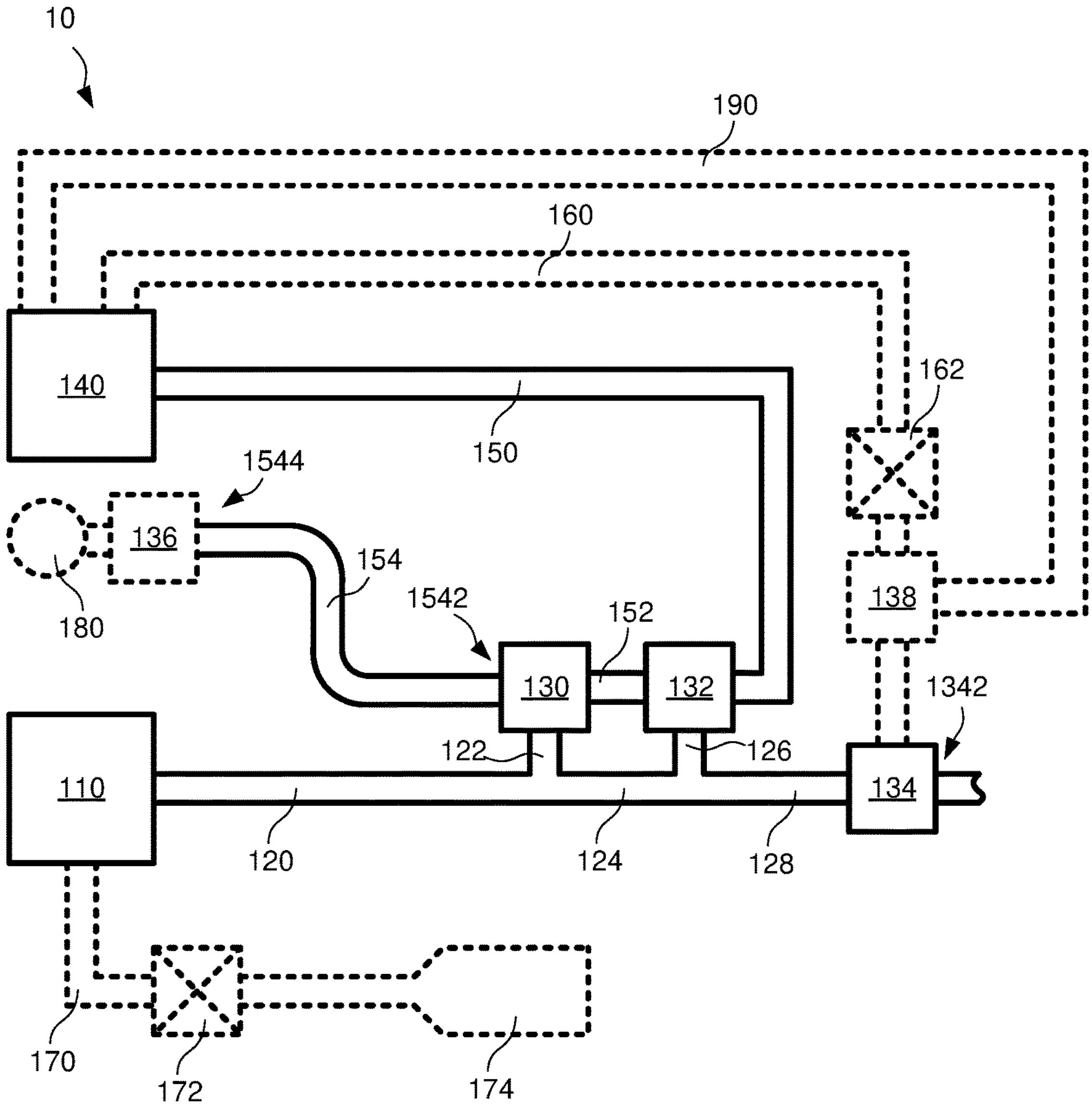
FIG. 1A illustrates a microfluidic system for providing a sample fluid having a predetermined sample volume.

FIG. 1A illustrates a microfluidic system 10 for providing a sample fluid (sample fluid not illustrated in FIG. 1A) having a predetermined sample volume.

The system comprises a sample reservoir 110 arranged for receiving a sample fluid. The sample reservoir 110 may be arranged for receiving the sample fluid by having an opening.

The system further comprises a first sample channel 120 connected to the sample reservoir 110. The first sample channel 120 branching off into a second sample channel 122 ending in a first valve 130, and into a third sample channel 124. The third sample channel 124 branching off into a fourth sample channel 126 ending in a second valve 132, and into a fifth sample channel 128 ending in a third valve 134, wherein the fifth sample channel 128 has a predetermined volume. The first valve 130, the second valve 132, and/or the third valve 134 may be trigger valves. A trigger valve may, in its closed state, stop a main fluid flow, and in its opened state, allow the main fluid flow to pass through the trigger valve. The trigger valve may be opened (i.e. changed to its opened state) by a secondary flow, and a combined flow of the main flow and the secondary flow may be allowed to flow through an output of the trigger valve. Such trigger valves may within the art be known as capillary trigger valves.

The system further comprises a buffer reservoir 140 arranged for receiving a buffer fluid. The buffer reservoir 140 may be arranged for receiving the buffer fluid by having an opening.

The system further comprises a first trigger channel 150 arranged to connect the buffer reservoir 140 to the second valve 132.

The system further comprises a second trigger channel 152 connecting the second valve 132 and the first valve 130.

The system further comprises an exit channel 154 having a first end 1542 and a second end 1544. The first end 1542 is connected to the first valve 130.

The first sample channel 120 is arranged to draw sample fluid from the sample reservoir 110 to fill the first, second, third, fourth, and fifth sample channels 120, 122, 124, 126, 128 by capillary action. The flows of sample fluid are stopped by the first valve 130, the second valve 132, and the third valve 134, as the valves are in their closed states.

The first trigger channel 150 is arranged to draw buffer fluid from the buffer reservoir 140, by capillary action, to the exit channel 154 via a fluid path comprising the second trigger channel 152, and to open the second valve 132 and the first valve 130, whereby a further fluid path comprising the fourth sample channel 126, the third sample channel 124, and the second sample channel 122 is opened up.

The opened further fluid path allows for sample present in the fourth sample channel 126, the third sample channel 124, and the second sample channel 122 to be replaced by buffer fluid from the first trigger channel 150 and flow into the exit channel 154 together with buffer fluid from the second trigger channel 152, thereby isolating a sample fluid present in the fifth sample channel 128 from adjacent sample fluid.

The first sample channel 120 and/or the fifth sample channel 128 may be adapted, e.g. by adapting their respective geometries (e.g., cross-sectional dimensions and/or shapes), such that capillary forces (or capillary pressures) prevent sample fluid present in the first sample channel 120 and/or the fifth sample channel 128 to flow towards the exit channel 154.

The second sample channel 122, the third sample channel 124, the fourth sample channel 126, the first trigger channel 150, the second trigger channel 152 and/or the exit channel 154 may be adapted, e.g. by adapting their respective geometries (e.g., cross-sectional dimensions and/or shapes), such that sample fluid present in the second sample channel 122, the third sample channel 124 and the fourth sample channel 126 may be replaced by buffer fluid from the first trigger channel 150 and to flow into exit channel 154 together with buffer fluid from the second trigger channel 152.

A volume of the isolated sample fluid corresponds to the volume of the fifth sample channel 128, thereby providing the sample fluid having the predetermined sample volume.

Thus, the present microfluidic system 10 is able to provide sample fluid having a predetermined volume. The sample fluid having the predetermined sample volume is isolated from adjacent sample fluid in the microfluidic system 10, without actively controlling the flows within the microfluidic system 10.

As shown in the example of FIG. 1A, the microfluidic system 10 may further comprise a timing channel 160 connecting the buffer reservoir 140 and the third valve 134. The timing channel 160 may be arranged to draw, by capillary action, buffer fluid from the buffer reservoir 140 to an output 1342 of the third valve 134 and to open the third valve 134, whereby the isolated sample fluid present in the fifth channel may be allowed to flow through the output 1342 of the third valve 134 together with buffer fluid from the timing channel 160. The output 1342 of the third valve 134 may be an output of the microfluidic system 10.

Hence, the isolated sample fluid may be extracted from the microfluidic system 10. It may, e.g., be provided to a further system for further treatment. This may be an analysis system arranged to analyse the isolated sample fluid. For such analysis systems, it may be advantageous to precisely meter the sample fluid to be analysed, which may be allowed by the present microfluidic system 10.

The timing channel 160 may be configured to open the third valve 134 subsequent to the sample fluid present in the fifth sample channel 128 being isolated from adjacent sample fluid. The timing channel 160 may be further configured to open the third valve 134 subsequent to sample fluid and buffer fluid reaching the second end 1544 of the exit channel 154.

As is shown in the example of FIG. 1A, the timing channel 160 may comprise a first flow resistor 162. A flow resistance of the first flow resistor 162 may be selected to control the flow rate from the buffer reservoir 140 to the third valve 134 such that the third valve 134 may be opened subsequent to sample fluid in the fifth sample channel 128 being isolated from adjacent sample fluid. Additionally, the flow resistance of the first flow resistor 162 may be selected to control the flow rate from the buffer reservoir 140 to the third valve 134 such that the third valve 134 may be opened subsequent to sample fluid and buffer fluid reaching the second end 1544 of the exit channel 154.

Thus, a length of the timing channel 160 may be decreased, while still allowing for the third valve 134 to be opened subsequent to the sample fluid in the fifth sample channel 128 being isolated from adjacent sample fluid.

As is shown in the example of FIG. 1A, the microfluidic system 10 may further comprise a capillary pump 174 arranged to empty the sample reservoir 110. The capillary pump 174 may be arranged to empty the sample reservoir 110 subsequent to the first, second, third, fourth, and fifth sample channels 120, 122, 124, 126, 128 being filled with sample fluid. The capillary pump 174 may be a paper pump and/or a microfluidic channel structure configured to draw liquid from the sample reservoir 110. During emptying of the sample reservoir 110 by the capillary pump 174, capillary pressures or capillary forces in the second sample channel 122, in the fourth sample channel 126, and in the fifth sample channel 128 may counteract drawing of sample fluid from the first sample channel 120, the second sample channel 122, the third sample channel 124, the fourth sample channel 126, and the fifth sample channel 128 in a direction towards the sample reservoir 110. The capillary pressures or capillary forces in the second sample channel 122, in the fourth sample channel 126, and in the fifth sample channel 128 may be higher than the capillary pressure or capillary force generated by the capillary pump 174, thereby avoiding emptying the second sample channel 122, the fourth sample channel 126, and the fifth sample channel 128.

The sample reservoir 110 may thereby receive sample fluid having a larger volume than a combined volume of the first, second, third, fourth, and fifth sample channel 120, 122, 124, 126, 128, thereby reducing a need to limit the volume of the sample fluid received by the sample reservoir 110. In case sample fluid is present in the sample reservoir 110 subsequent to filling the first, second, third, fourth, and fifth sample channel 120, 122, 124, 126, 128, additional sample fluid may be drawn by capillary action from the sample reservoir 110 upon opening the first, the second, and/or the third valves 130, 132, 134. Emptying the sample reservoir 110 from fluid subsequent to filling the first, second, third, fourth, and fifth sample channel 120, 122, 124, 126, 128, allows a capillary pressure or capillary force at an interface between sample fluid in the first sample channel 120 and the sample reservoir 110 to counteract drawing of sample fluid from the first sample channel 120 in a direction from the sample reservoir 110.

The capillary pump 174 may be connected to the sample reservoir 110 via a second flow resistor 172. A flow resistance of the second flow resistor 172 may be selected to control the flow rate from the sample reservoir 110 to the capillary pump 174 such that the sample reservoir 110 may be emptied subsequent to the first sample channel 120, the second sample channel 122, the third sample channel 124, the fourth sample channel 126, and the fifth sample channel 128 being filled with sample fluid. The capillary pump 174 may be connected to the sample reservoir via a pump capillary channel 170, and the pump capillary channel 170 may comprise the second flow resistor 172.

The microfluidic system 10 may further comprise a stop valve 136 connected to the second end 1544 of the exit channel 154.

The microfluidic system 10 may further comprise a vent 180 connected to the stop valve 136. The vent 180 may be arranged to allow gaseous communication between the stop valve 136 and surroundings of the microfluidic system 10 such that gas present in the exit channel 154 may be allowed to escape. Gas present in one or more of the first sample channel 120, the second sample channel 122, the third sample channel 124, the fourth sample channel 126, the first trigger channel 150, and the second trigger channel 152 may be allowed to escape through the vent 180 via the exit channel 154. Additionally, gas present in one or more of the first sample channel 120, the second sample channel 122, the third sample channel 124, the fourth sample channel 126, the fifth sample channel 128, the first trigger channel 150, and the second trigger channel 152 may be allowed to escape through the output 1342 of the third valve 134. Gas present in the channels may result in a build-up of gaseous pressure in the channels, which may act against the flow of fluid in the channels by capillary action. By allowing gas to escape, such build-up may be avoided, thereby allowing for an improved flow of the sample fluid and/or the buffer fluid.

The sample fluid and/or the buffer fluid may be an aqueous liquid. The sample liquid may be blood.

One or more walls of the channels may comprise silica, glass, a polymeric material, polycarbonate, silicon, poly (methyl methacrylate) (PMMA), polydimethylsiloxane (PDMS), and/or cyclic olefin copolymer (COC). The channels of the microfluidic system 10 may be comprised in a substrate comprising silica. The silica may be in form of fused silica.

The timing channel 160 may connect the buffer reservoir 140 and the third valve via a fourth valve 138.

The microfluidic system may further comprise a dilution channel 190 connecting the buffer reservoir 140 and the fourth valve 138. The fourth valve 138 may, in its closed state, be configured to stop buffer fluid from flowing from the dilution channel 190 to the third valve.

The dilution channel 190 may be configured to draw, by capillary action, buffer fluid from the buffer reservoir 140 to the fourth valve 138. The dilution channel 190 may be a capillary channel.

The timing channel 160 may be further configured to open the fourth valve 138, whereby buffer fluid is allowed to flow from the dilution channel 190 to the third valve 134. Thus, the fourth valve 138 may, in its open state, be configured to allow buffer fluid to flow from the dilution channel 190 to the third valve 134.

A dilution ratio of the sample fluid exiting the output 1342 of the third valve 134 relative to the buffer fluid may thereby be controlled by adjusting the flow resistances of one or more of the timing channel 160, the first flow resistor 162, the dilution channel 190, the first trigger channel 150, the second trigger channel 152, the second sample channel 122, the third sample channel 124, the fourth sample channel 126 and the fifth sample channel 128.

Figure 1B:
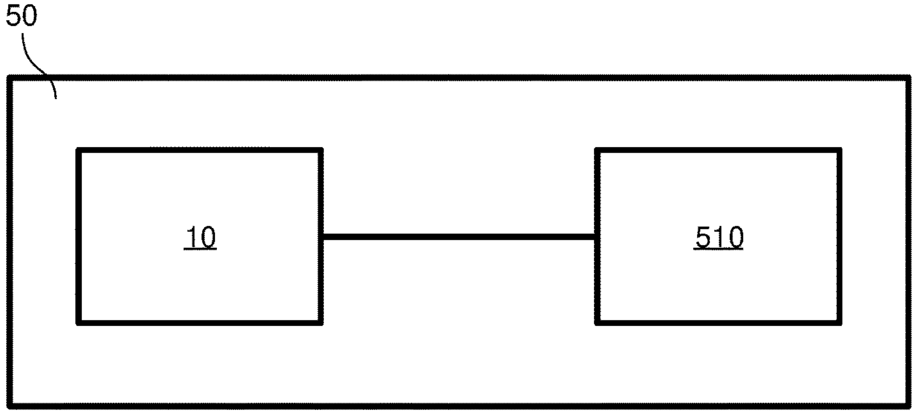
FIG. 1B illustrates a diagnostic device comprising a microfluidic system for providing a sample fluid having a predetermined sample volume.

FIG. 1B illustrates a diagnostic device 50 comprising a microfluidic system 10 for providing a sample fluid having a predetermined sample volume. The microfluidic system 10 of FIG. 1B may correspond to the microfluidic system 10 described in relation to FIG. 1A.

The diagnostic device 50 may be arranged to analyse the provided sample fluid having the predetermined sample volume. The diagnostic device 50 may be arranged to analyse the provided sample fluid having the predetermined sample volume by comprising an analysis system 510, as is shown in the example of FIG. 1B. An input of the analysis system 510 may be fluidically connected to an output of microfluidic system 10. The analysis system 510 may comprise vents allowing for gaseous communication between the analysis system 510 and its surroundings and/or between the analysis system 510 and the surroundings of the diagnostic device 50, in order to avoid build-up of gaseous pressure in the microfluidic system 10 and/or the analysis system 510.

The present inventive concept will now be described with reference to FIG. 2A-2E. FIG. 2A-2E illustrate a microfluidic system 20 comprising a sample reservoir 210 and a first sample channel 220 connected to the sample reservoir 210. The first sample channel 220 branches off into a second sample channel 222 ending in a first valve 230, and into a third sample channel 224. The third sample channel 224 branches off into a fourth sample channel 226 ending in a second valve 232, and into a fifth sample channel 228 ending in a third valve 234. It is to be understood that the microfluidic system 20 of FIG. 2A-2E may further comprise a dilution channel and a fourth valve, as described in relation to FIG. 1A.

The microfluidic system 20 further comprises a buffer reservoir 240, a first trigger channel 250, a second trigger channel 252, and an exit channel 254. The first trigger channel 250 is arranged to connect the buffer reservoir 240 to the second valve 232, and the second trigger channel 252 connects the second and the first valves 232, 230. The exit channel 254 has a first end 2542 and a second end 2544, and the first end 2542 is connected to the first valve 230. The second end 2544 of the exit channel 254 may be open. By open here is meant that an inside of the exit channel 254 is in gaseous communication with the surroundings of the microfluidic device 20. The second end 2544 of the exit channel 254 may be connected to a vent (not shown). As is shown in the example of FIG. 2A-2E, the second end 2544 of the exit channel 254 may be connected to a stop valve 236.

The sample reservoir 210 is arranged to receive a sample fluid, and the buffer reservoir 240 is arranged to receive a buffer fluid. The sample and/or the buffer fluid may be an aqueous liquid.

As is exemplified in FIG. 2A-2E, the microfluidic system 20 may further comprise a timing channel 260 connecting the buffer reservoir 240 and the third valve 234, and the timing channel 260 may connect the buffer reservoir 240 and the third valve 234 via a first flow resistor 262.

The microfluidic system 20 may further comprise, as is exemplified in FIG. 2A-2E a capillary pump 274 connected to the sample reservoir 210. The capillary pump 274 may be connected to the sample reservoir 210 via a second flow resistor 272.

The microfluidic system 20 may further comprise a vent 280 connected to the stop valve 236, as is shown in the example of FIG. 2A-2E. The vent 280 may allow for gas present in the sample channels and/or the trigger channels to escape. Thus, any gas present in the microfluidic system 20 may escape, which allows for the sample and/or buffer fluids to flow through the channels of the microfluidic system 20. Gas present in the microfluidic system 20 may further escape through an output 2342 of the third valve 234. This may, e.g., allow gas present in the timing channel 260 to escape the microfluidic system 20.

The microfluidic system 20 of FIG. 2A-2E may correspond to the microfluidic system 10 described in relation to FIG. 1A.

Figure 2A:
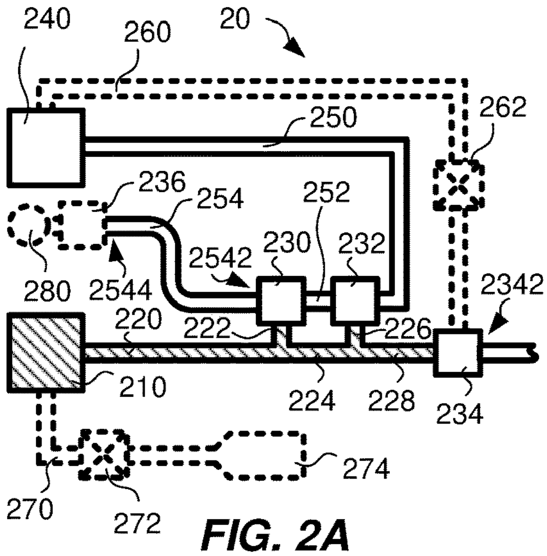
FIG. 2A-2E illustrate a microfluidic system that may correspond to the microfluidic system of FIG. 1A when it is used to provide the sample fluid having the predetermined sample volume.
Figure 2B:
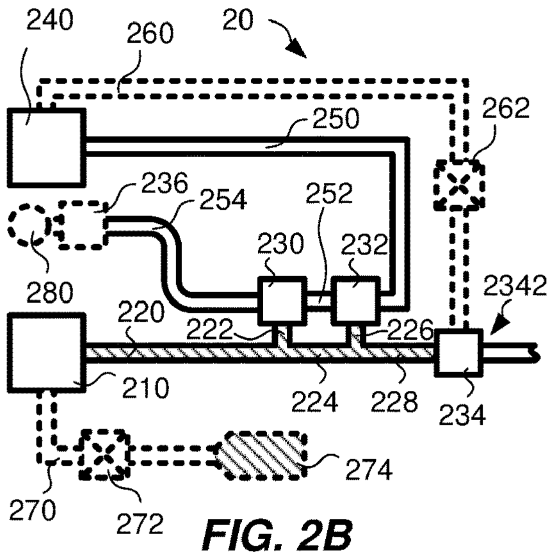

In FIG. 2A, sample fluid is provided to the sample reservoir 210. The first channel draws sample fluid from the sample reservoir 210 to fill the first, second, third, fourth, and fifth sample channels 220, 222, 224, 226, 228 by capillary action. The sample fluid drawn from the sample reservoir 210 stops at the first, second, and third valves 230, 232, 234. The sample reservoir 210 may be, subsequent to the first, second, third, fourth, and fifth sample channels 220, 222, 224, 226, 228 being filled, emptied using the capillary pump 274 through a pump channel 270 via the second flow resistor 272, as is exemplified in FIG. 2B. A flow resistance of the second flow resistor 272 may be selected such that the sample reservoir 210 may be emptied subsequent to the first, second, third, fourth, and fifth samples channels being filled with sample fluid. The capillary pressures or capillary forces in the second sample channel 222, in the fourth sample channel 226, and in the fifth sample channel 228 may be higher than the capillary pressure or capillary force generated by the capillary pump, thereby avoiding emptying the second sample channel 222, the fourth sample channel 226 and the fifth sample channel 228.

Figure 2C:
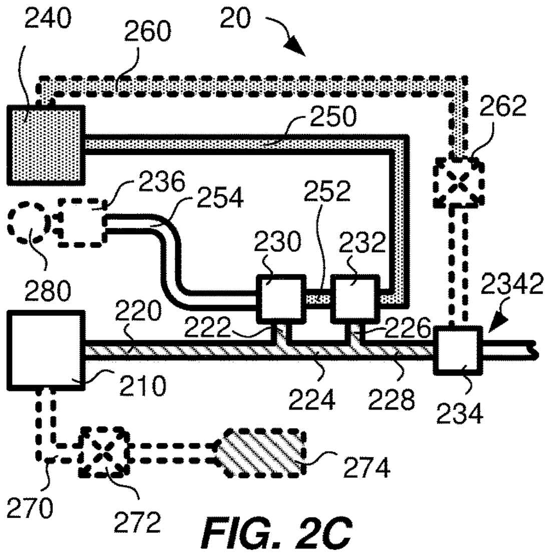

In FIG. 2C, buffer fluid is provided to the buffer reservoir 240. The first trigger channel 250 draws buffer fluid from the buffer reservoir 240, by capillary action towards the exit channel 254 via a fluid path comprising the second trigger channel 252 as is shown in FIG. 2C. Further, as is exemplified in FIG. 2C, the timing channel 260 may draw buffer fluid from the buffer reservoir 240 to the third valve 234 via the first flow resistor 262 by capillary action. A flow resistance of the first flow resistor 262 may be selected such that buffer fluid reaches the third valve 234 subsequent to the isolation of the sample fluid present in the fifth sample channel 228 (described below).

Figure 2D:
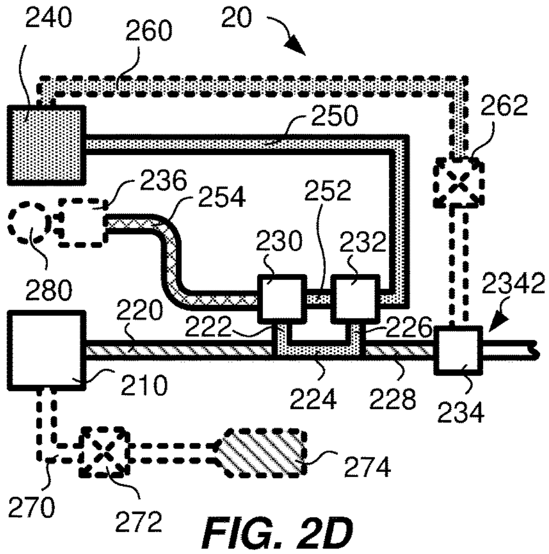

Upon reaching the second and first valves 230, 232, the buffer fluid opens the second valve 232 and the first valve 230, whereby a further fluid path comprising the fourth sample channel 226, the third sample channel 224, and the second sample channel 222 is opened up. The further fluid path allows for sample fluid present in the fourth, the third, and the second sample channels to be replaced by buffer fluid from the first trigger channel 250 and to flow into the exit channel 254 together with buffer fluid from the second trigger channel 252, as shown in the example of FIG. 2D. Hence, the volume of the exit channel 254 may be sufficiently large to drain the sample fluid formerly present in the fourth sample channel 226 the third sample channel 224, and the second sample channel 222. At a point when the second valve 232 is open but the first valve 230 is not yet open, capillary pressure, for example, in the first sample channel 220, in the second sample channel 222 and in the fifth sample channel 228 may act in preventing sample fluid from being drawn into second trigger channel 252 via the fourth sample channel 226 and the second valve 232. This prevention is promoted or enabled by the sample reservoir 210 being emptied of sample and the third valve 234, as well as the first valve 230, not yet being opened up. As is also shown in the example of FIG. 2D, buffer fluid and sample fluid flow into the exit channel 254 and reach the stop valve 236. As is shown in FIG. 2D, the sample fluid present in the fifth sample channel 228 is then isolated from adjacent sample fluid. The sample fluid having the predetermined volume is thereby provided. At a point when the first valve 230 and the second valve are open, capillary forces, for example, between the sample liquid and the wetted walls of the first sample channel 220 and in the fifth sample channel 228 may act in preventing sample fluid from being drawn into the exit channel 254 via the second sample channel 222 and the first valve 230, and/or the fourth sample channel 226 and the second valve 234. This prevention may be promoted by the sample reservoir 210 being emptied of sample fluid and the third valve 234 not yet being opened up.

Figure 2E:
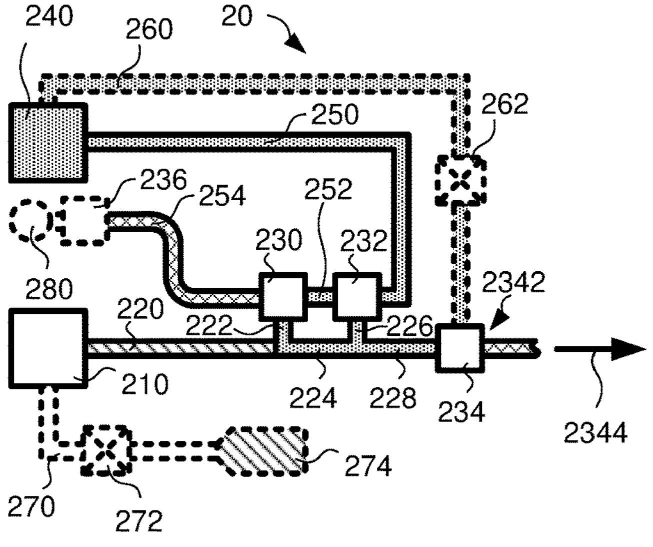

Subsequent to the sample fluid present in the fifth sample channel 228 is isolated, the buffer fluid may reach the third valve 234, which, in response, is opened. It is also seen by comparing FIG. 2D and FIG. 2E that, prior to opening the third valve 234, buffer fluid and sample fluid have flowed into the exit channel 254 and reached the stop valve 236. After the third valve 234 is opened, the isolated sample fluid present in the fifth sample channel 228 may be allowed to flow through the output 2342 of the third valve 234 together with buffer fluid present in the timing channel 260, as is shown in the example of FIG. 2E. This is indicated in FIG. 2E by arrow 2344. A dilution ratio of the sample fluid exiting the output 2342 of the third valve relative to the buffer fluid may be controlled in a manner similar to as described in relation to FIG. 1A, by, e.g., using a dilution channel (not shown in FIG. 2A-FIG. 2E).

Figure 3:
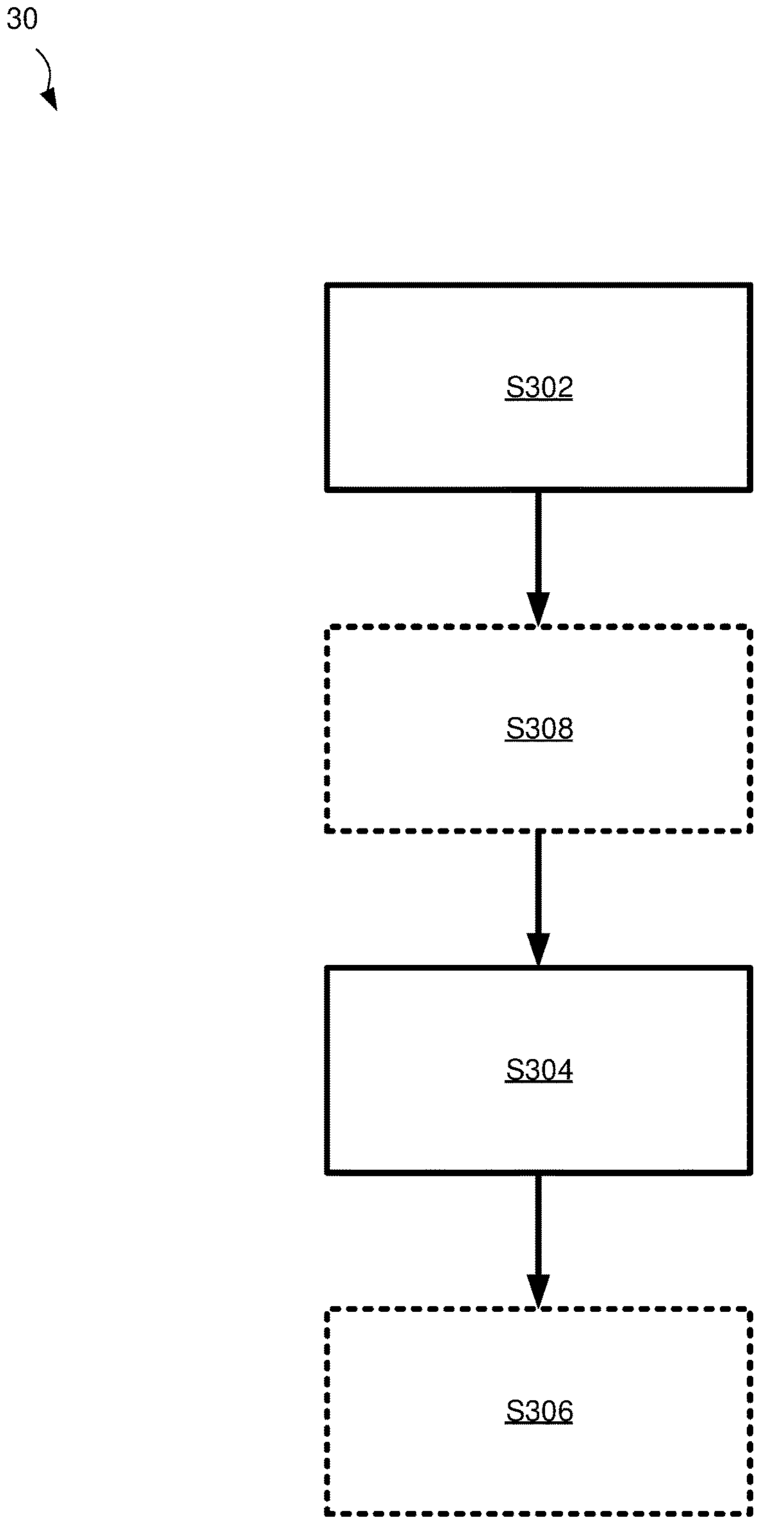
FIG. 3 is a block scheme of a method for providing a sample fluid having a predetermined sample volume.

FIG. 3 is a block scheme of a method 30 for providing a sample fluid having a predetermined sample volume.

The method 30 comprises adding S302 sample fluid to a sample reservoir 110, 210, whereby a first sample channel 120, 220 draws sample fluid from the sample reservoir 110, 210 to fill the first sample channel 120, 220, a second sample channel 122, 222, a third sample channel 124, 224, a fourth sample channel 126, 226, and a fifth sample channel 128, 228 by capillary action.

The second sample channel 122, 222 and the third sample channel 124, 224 are branches of the first sample channel 120, 220, and the fourth sample channel 126, 226 and the fifth sample channel 128, 228 are branches of the third sample channel 124, 224.

The second sample channel 122, 222 ends in a first valve 130, 230, the fourth sample channel 126, 226 ends in a second valve 132, 232, and the fifth sample channel 128, 228 ends in a third valve 134, 234.

The method 30 further comprises adding S304 buffer fluid to a buffer reservoir 140, 240, whereby a first trigger channel 150, 250 draws buffer fluid from the buffer reservoir 140, 240, by capillary action, to an exit channel 154, 254 connected to the first valve 130, 230. The exit channel 154, 254 may be connected to the first valve 130, 230 at a first end 1542, 2542 of the exit channel 154, 254. A second end 1544, 2544 of the exit channel 154, 254 may be connected to a stop valve 136, 236. The stop valve 136, 236 may be connected to a vent 180, 280 allowing gaseous communication between the buffer fluid and/or the sample fluid with surroundings of the microfluidic system 10, 20 such that gas present within the microfluidic system 10, 20 may escape.

The buffer fluid is drawn to the exit channel 154, 254 via a fluid path comprising a second trigger channel 152, 252 connecting the first valve 130, 230 and the second valve 132, 232, and opens the second valve 132, 232 and the first valve 130, 230 such that a further fluid path comprising the fourth sample channel 126, 226, the third sample channel 124, 224, and the second sample channel 122, 222 is opened up, and sample present in the fourth sample channel 126, 226, the third sample channel 124, 224, and the second sample channel 122, 222 is replaced by buffer fluid from the first trigger channel 150, 250 and flows via the further fluid path into the exit channel 154, 254 together with buffer fluid from the second trigger channel 152, 252, whereby a sample fluid present in the fifth sample channel 128, 228 is isolated from adjacent sample fluid and having a volume corresponding to a volume of the fifth sample channel 128, 228, thereby providing the sample fluid having the predetermined sample volume.

The above-mentioned features of the first and second aspects, when applicable, apply to this third aspect as well. In order to avoid undue repetition, reference is made to the above.

The method 30 may further comprise opening S306 the third valve 134, 234 such that isolated (i.e. isolated in the fifth sample channel 128, 228) sample fluid flows through an output of the third valve 134, 234. The third valve 134, 234 may be connected to the buffer reservoir 140, 240 via a timing channel 160, 260. The timing channel 160, 260 may draw buffer fluid from the buffer reservoir 140, 240 to the third valve 134, 234 by capillary action, and the third valve 134, 234 may be opened in response to buffer fluid reaching the third valve 134, 234. In response to opening the third valve 134, 234, the isolated sample fluid may flow through the output of the third valve 134, 234 together with buffer fluid from the timing channel 160, 260. The timing channel 160, 260 may be arranged to open the third valve 134, 234 subsequent to the sample fluid is isolated in the fifth sample channel 128, 228, and subsequent to sample fluid and buffer fluid reaching the second end 1544, 2544 of the exit channel 154, 254. The timing channel 160, 260 may comprise a first flow resistor 162, 262 and a flow resistance of the first flow resistor 162, 262 may be selected such that the buffer fluid in the timing channel 160, 260 reaches the third valve 134, 234 subsequent to the sample fluid is isolated in the fifth sample channel 128, 228, and subsequent to sample fluid and buffer fluid reaching the second end 1544, 2544 of the exit channel 154, 254.

The method 30 may further comprise, subsequent to adding S302 sample fluid to the sample reservoir 110, 210 and antecedent to adding S304 buffer fluid to the buffer reservoir 140, 240, emptying S308 the sample reservoir 110, 210. The sample reservoir 110, 210 may be emptied by use of a capillary pump 174, 274 connected to the sample reservoir 110, 210. The capillary pump 174, 274 may be connected to the sample reservoir 110, 210 via a second flow resistor 172, 272, wherein a flow resistance of the second flow resistor 172, 272 is selected to control the flow rate from the sample reservoir 110, 210 to the capillary pump 174, 274 such that the sample reservoir 110, 210 is emptied subsequent to the first sample channel 120, 220, the second sample channel 122, 222, the third sample channel 124, 224, the fourth sample channel 126, 226, and the fifth sample channel 128, 228 being filled with sample fluid.

It is to be understood that the method 30 may use the microfluidic system 10, 20 of FIG. 1A and/or FIG. 2A-2E.

The person skilled in the art realizes that the present inventive concept by no means is limited to the preferred variants described above. On the contrary, many modifications and variations are possible within the scope of the appended claims.

For example, the channels of the microfluidic system 10, 20 have been described as being closed/enclosed channels. However, it is to be understood that the channels may be open, in the sense that a channel is confined in one dimension only. This may, for example, be channels having a bottom and two sides, while the top of the channel is removed. For such a configuration, the channels are allowed for direct gaseous communication with the surroundings, removing the need for vents.

As a further example, the sample and buffer fluids are described as being added to the sample and buffer reservoirs 110, 210, 140, 240 at separate points in time. However, they may be added simultaneously, and the flow rates and/or dimensions (e.g. lengths) of the channels may be adapted such that the channels are filled in the described order. For instance, that the first, second, third, fourth, and fifth sample channels 120, 220, 122, 222, 124, 224, 126, 226, 128, 228 are filled with sample fluid prior to the buffer fluid reaching the second and first valves 132, 232, 130, 230, and/or that sample fluid together with buffer fluid reaches the second end 1544, 2544 of the exit channel 154, 254 prior to buffer fluid reaching the third valve 134, 234.

Additionally, variations to the disclosed variants can be understood and effected by the skilled person in practicing the claimed invention, from a study of the drawings, the disclosure, and the appended claims.

The invention claimed is:

1. A microfluidic system for providing a sample fluid having a predetermined sample volume, the system comprising:

a sample reservoir arranged for receiving a sample fluid;

a first sample channel connected to the sample reservoir, the first sample channel branching off into a second sample channel ending in a first valve, and into a third sample channel, the third sample channel branching off into a fourth sample channel ending in a second valve, and into a fifth sample channel ending in a third valve, wherein the fifth sample channel has a predetermined volume;

a buffer reservoir arranged for receiving a buffer fluid;

a first trigger channel arranged to connect the buffer reservoir to the second valve;

a second trigger channel connecting the second valve and the first valve; and an exit channel having a first end and a second end, wherein the first end is connected to the first valve;

wherein the first sample channel is arranged to draw sample fluid from the sample reservoir to fill the first, second, third, fourth, and fifth sample channels by capillary action;

wherein the first trigger channel is arranged to draw buffer fluid from the buffer reservoir, by capillary action, to the exit channel via a fluid path comprising the second trigger channel, and to open the second valve and the first valve, whereby a further fluid path comprising the fourth sample channel, the third sample channel, and the second sample channel is opened up, allowing for sample present in the fourth sample channel, the third sample channel, and the second sample channel to be replaced by buffer fluid from the first trigger channel and flow into the exit channel together with buffer fluid from the second trigger channel, thereby isolating a sample fluid present in the fifth sample channel from adjacent sample fluid, wherein a volume of the isolated sample fluid corresponds to the volume of the fifth sample channel, thereby providing the sample fluid having the predetermined sample volume, the microfluidic system further comprising: a timing channel connecting the buffer reservoir and the third valve, wherein the timing channel is arranged to draw, by capillary action, buffer fluid from the buffer reservoir to an output of the third valve and to open the third valve, whereby the isolated sample fluid present in the fifth channel is allowed to flow through the output of the third valve together with buffer fluid from the timing channel.

2. The microfluidic system according to claim 1, wherein the timing channel is configured to open the third valve subsequent to the sample fluid present in the fifth sample channel being isolated from adjacent sample fluid.

3. The microfluidic system according to claim 2, wherein the timing channel comprises a first flow resistor, wherein a flow resistance of the first flow is selected to control the flow rate from the buffer reservoir to the third valve such that the third valve is opened subsequent to sample fluid in the fifth sample channel being isolated from adjacent sample fluid.

4. The microfluidic system according to claim 1, further comprising:

a capillary pump arranged to empty the sample reservoir.

5. The microfluidic system according to claim 4, wherein the capillary pump is connected to the sample reservoir via a second flow resistor, wherein a flow resistance of the second flow resistor is selected to control the flow rate from the sample reservoir to the capillary pump such that the sample reservoir is emptied subsequent to the first sample channel, the second sample channel, the third sample channel, the fourth sample channel, and the fifth sample channel being filled with sample fluid.

6. The microfluidic system according to claim 1, further comprising a stop valve connected to the second end of the exit channel.

7. The microfluidic system according to claim 6, further comprising:

a vent connected to the stop valve, wherein the vent is arranged to allow gaseous communication between the stop valve and surroundings of the microfluidic system such that gas present in the exit channel is allowed to escape.

8. The microfluidic system according to claim 1, wherein one or more walls of the channels comprises silica, glass, a polymeric material, polycarbonate, silicon, poly(methyl methacrylate) (PMMA), polydimethylsiloxane (PDMS), and/or cyclic olefin copolymer (COC).

9. The microfluidic system according to claim 1, wherein the timing channel connects the buffer reservoir and the third valve via a fourth valve, the microfluidic system further comprising:

a dilution channel connecting the buffer reservoir and the fourth valve, the dilution channel being configured to draw, by capillary action, buffer fluid from the buffer reservoir to the fourth valve; and wherein the timing channel is further configured to open the fourth valve, whereby buffer fluid is allowed to flow from the dilution channel to the third valve.

* * * * *